United States Patent

Rendessy

[15] 3,680,891

[45] Aug. 1, 1972

[54] SWAY CONTROL FOR TRAILER HITCH

[72] Inventor: William L. Rendessy, 1839 E. Moreland, Phoenix, Ariz. 85006

[22] Filed: Aug. 8, 1969

[21] Appl. No.: 848,602

[52] U.S. Cl. ............................................280/446 B
[51] Int. Cl. ..............................................B60d 1/00
[58] Field of Search ..........280/446 B, 446, 461, 474; 254/189, 190 R; 74/242.8, 242.1, 242.12

[56] References Cited

UNITED STATES PATENTS

| | | | |
|---|---|---|---|
| 119,539 | 10/1871 | Smith | 254/190 R |
| 212,916 | 3/1879 | Fischer | 254/190 R |
| 668,594 | 2/1901 | Walton | 254/191 |
| 3,338,595 | 8/1967 | Bogie | 280/446 B |
| 3,362,727 | 1/1968 | Malherbe | 280/446 B |

Primary Examiner—Benjamin Hersh
Assistant Examiner—Robert R. Song
Attorney—Wm. H. Dean

[57] ABSTRACT

A sway control device for trailer hitches comprising a cable means having opposite ends and an intermediate portion; said intermediate portion engaged by a plurality of rotary members, one of which serves to frictionally dampen the movement of said cable; another of said rotary members being movable laterally on its axis to provide for taut or slack condition of said cable for operation of the damping of said cable or the release thereof for hitching and unhitching; opposite end of said cable removably connected to the towing vehicle in laterally spaced relation to the normal hitch of a trailer and a towing vehicle.

5 Claims, 16 Drawing Figures

PATENTED AUG 1 1972          3,680,891
SHEET 1 OF 4
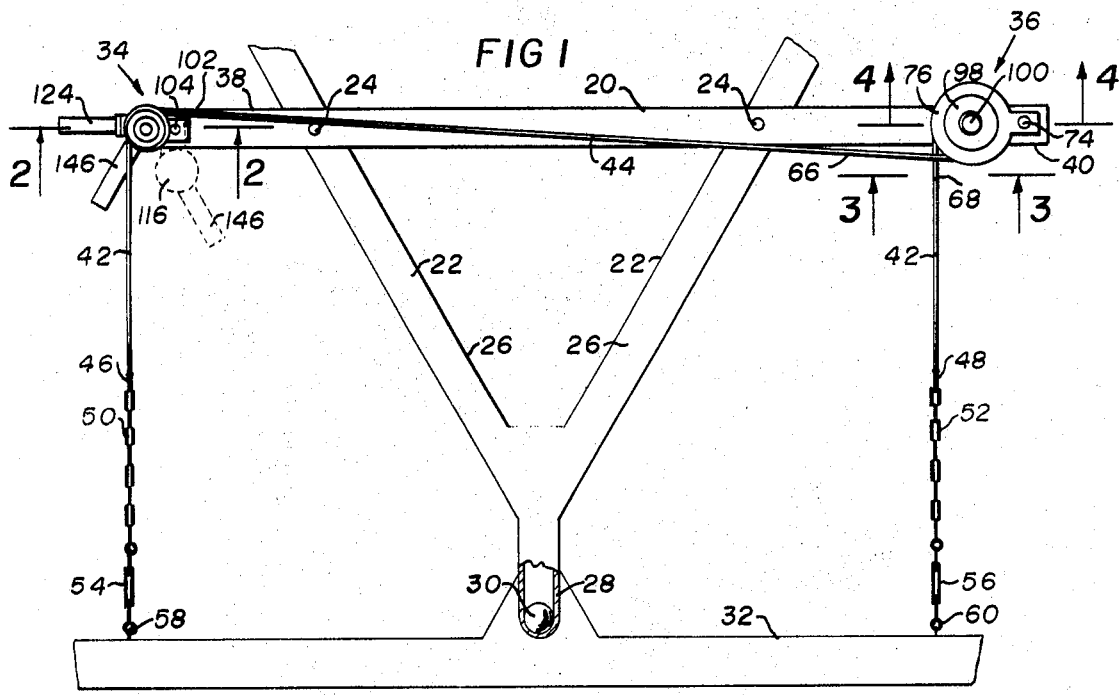
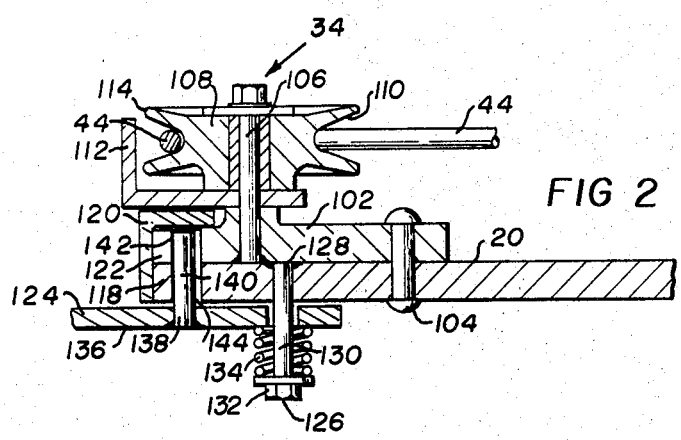
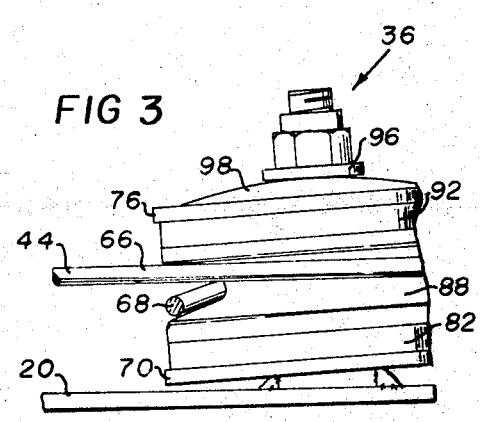
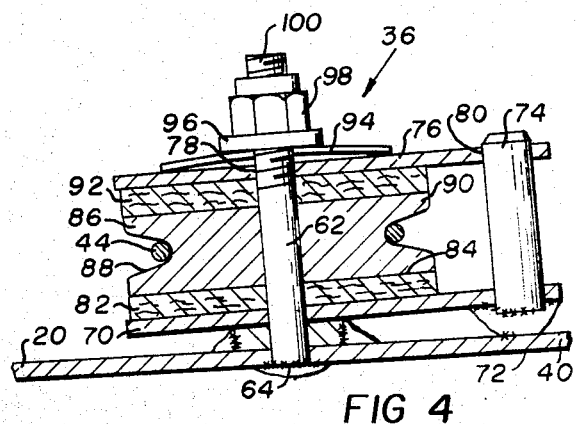
INVENTOR.
WILLIAM L. RENDESSY
BY
Wm. H. Dean INVENTOR.
WILLIAM L. RENDESSY
BY
Wm. H. Dean

INVENTOR.
WILLIAM L. RENDESSY
BY

3,680,891

SWAY CONTROL FOR TRAILER HITCH

BACKGROUND OF THE INVENTION

Various sway control devices for trailer hitches have been utilized and some of them have been relatively complicated and expensive as compared to others. Additionally, some of the prior art trailer hitch sway control devices have been difficult to release for unhitching said devices relative to a towing vehicle and various prior art devices have been difficult to install and/or expensive. Furthermore, many of these prior art devices have lacked efficient structural features to enable such devices to provide efficient sway damping of trailer hitches as well as sufficient functional power to adequately damp substantial sway action forces imposed thereon.

SUMMARY OF THE INVENTION

The present invention relates to a variety of simple, efficient, economical and easily operable sway control devices for trailer hitches and particularly provided with novel damping means in combination with control cable means and cable slackening and release means in relation to rotary members over which the said cables are engaged and operable while opposite ends of the cable means are connected to a towing vehicle in spaced relation to a conventional pivotal trailer hitch coupled thereto. Additionally, the present invention relates to various specific and highly practical and economical and simplified structures implying a combination of frictionally damped rotary members and axially releasable rotary members operating in combination efficiently to damp trailer hitch sway tendencies and also to permit convenient tightening and slackening of control cables of the invention for the purposes of hitching and unhitching the cables of the towing vehicle in a very simple and efficient manner.

The invention also relates to various means for maintaining substantial frictional engagement of a control cable of the invention relative to peripheral portions of a rotary member or members for which they utilize frictional damping means in connection therewith.

The invention also comprises novel means for releasing the control cable of the invention as well as frictional damping of the rotary member in order to slacken or tighten the control cable of the invention for hitching or unhitching the control cable relative to a towing vehicle.

Furthermore, the invention comprises the novel disposition of idlers and other rotary means of the invention for maintaining the control cable of the invention wrapped around a damped rotary member for more than 180° in connection therewith to maintain substantial engagement of the control cable of the invention with the rotary means which is damped in order to obtain efficient operation of the damped rotary member and to obtain sufficient frictional engagement of the cable with the rotary member to handle substantial forces without causing the cable to slip relative to the rotary member.

Additionally, the invention specifically relates to various means for maintaining a control cable wrapped substantially around a damped rotary member and for holding the rotary member rotatable on a tilted axis so that the cable may be wrapped around the rotary member almost 360° but the cable is so held by the tilted axis of the rotary member so as to have clearance as the cable crosses itself moving to and from peripheral portions of the rotary member.

Accordingly, it is an object of the present invention to provide the very simple, economical and efficient sway control for trailer hitches.

Another object of the invention is to provide a novel cable controlled sway control for trailer hitches wherein an intermediate portion of a cable may be engaged with a plurality of rotary members one of which is frictionally damped and the other of which may be moved laterally of its axis for loosening or tightening the cable of the invention so that it may readily be hitched and unhitched at its opposite ends relative to a towing vehicle.

Another object of the invention is to provide a variety of cable release and slackening mechanisms which may be used readily to provide for hitching and unhitching of opposite ends of the cable relative to a towing vehicle.

Another object of the invention is to provide novel means of the invention for maintaining a control cable of the invention wrapped more than 180° around the periphery of a damped rotary member.

Another object of the invention is to provide a variety of novel release mechanisms operable for slackening and tightening the control cable of the invention.

Other objects and advantages of the invention may be apparent from the following specification, appended Claims and accompanying drawings.

BRIEF DESCRIPTION OF THE DRAWINGS

FIG. 1 is a fragmentary top plan view of a trailer tongue and hitch member pivotally hitched and coupled to a towing vehicle bumper structure and showing a preferred sway control device of the invention in connection with the trailer tongue and bumper of a towing vehicle;

FIG. 2 is an enlarged fragmentary sectional view taken from a line 2—2 of FIG. 1;

FIG. 3 is an enlarged fragmentary sectional view taken from a line 3—3 of FIG. 1;

FIG. 4 is an enlarged fragmentary sectional view taken from a line 4—4 of FIG. 1;

DESCRIPTION OF THE PREPARED EMBODIMENTS

Figure 5:
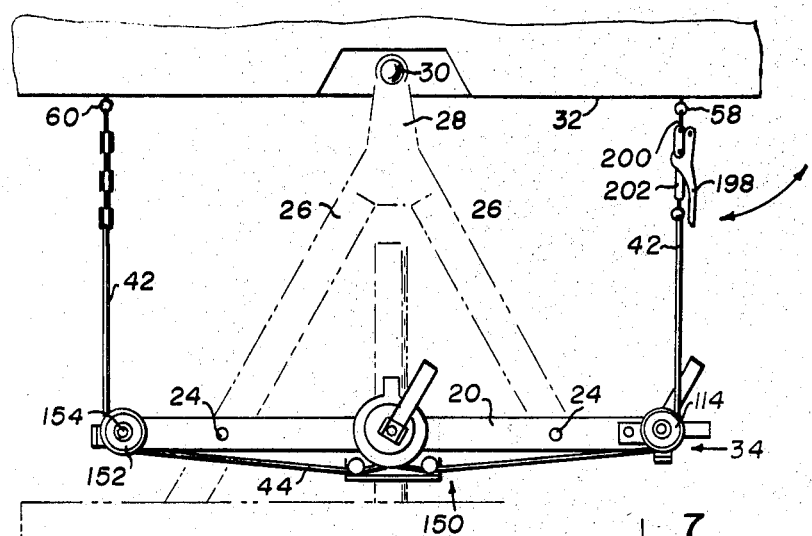
FIG. 5 is a view similar to FIG. 1 showing a modification of the invention.

As shown in FIG. 1 of the drawings, the invention includes a bar 20 adapted to be connected to a trailer tongue 22 in substantially transverse relationship therewith, the bar 20 being coupled by means of bolts 24 to converging members 26 of a trailer tongue. This trailer tongue is provided with a conventional ball socket hitch member 28 adapted to engage a ball member 30 mounted on a bumper 32 of a towing vehicle.

The bar 20 carries rotor assemblies 34 and 36 located near opposite end portions 38 and 40 respectively of the bar 20. The rotor assemblies 34 and 36 are provided with substantially angular rotors as will be hereinafter described. These rotors are engaged by a cable 42 having an intermediate portion 44 engaging the rotors of the assemblies 34 and 36. Thus, cable 44 is provided with opposite end portions 46 and 48 coupled by chains 50 and 52 having turnbuckles 54 and 56 adapted to engage eye bolts 58 and 60 coupled to the bumper 32. The turnbuckles are provided with hooks which hook into the eye bolts 58 and 60 and are readily removable when the cable 42 is in slack condition as will be hereinafter described in detail.

The rotor assembly 36 is shown in section FIG. 4 of the drawings and is provided with an axle shaft 62 having its normally lower end 64 welded or otherwise fixed to the bar 20 and this axle shaft 62 is inclined generally to the vertical for the purpose of providing clearance of crossing portions 66 and 68 of the intermediate portion 44 of cable 42 as will be hereinafter described and as shown in FIG. 3 of the drawings.

Mounted on the axle shaft 62 is a base plate 70 which is welded or otherwise fixed at 72 to the bar 20. The plate 70 carries an upstanding torque resisting pin 74 which is also welded or otherwise coupled to the plate 70 and the bar 20. A second plate 76 is provided with a central opening 78 fitted over the axle shaft 62 and this plate 76 is also provided with another opening 80 fitted over an upstanding end of the torque resisting shaft 74.

Mounted on the shaft 62 adjacent to plate 70 is a friction plate 82 which frictionally engages and damps one side 84 of a cable engaging rotor 86. This cable engaging rotor 86 is provided with single generally V-shaped in cross section annular cable engaging groove 88 in the periphery thereof and this groove 88 being an inwardly converging groove is engaged by the intermediate portion 44 of the cable 42.

The cable engaging rotor 86 is provided with a side 90 which is opposite to the side 84 thereof and this side 90 is engaged by a second friction plate 92 which at its opposite side is engaged by the plate 76. The plate 76 is resiliently forced against the friction plate 92 by means of a conventional resilient diaphragm type washer commonly known as a Belleville washer designated 94. This washer 94 is centrally mounted on the axle shaft 62 and is engaged by a plate washer 96 held against the washer 94 by a screw threaded lock nut 98, screw threadably and adjustably mounted on a screw threaded end 100 of the axle shaft 62.

The friction plates 82 and 92 provide frictional resistance to the rotation of the rotor 86 between the friction plates 82 and 92 and adjustable tension of the Belleville washer 98 provides for variable frictional loading of the rotor 86 against rotation about the axis of the axle shaft 62 when the cable portion 44 tends to rotate the rotor 86 about said axis of said shaft 62.

As shown in FIG. 3 of the drawings, the tilted axis of the axle shaft 62 provides for approach and departure operation of the crossed cable portion 66 and 68 relative to the single groove 88 of the rotor 86 so that these crossed portions 66 and 68 do not abrade or touch each other and cause them to wear on the intermediate portion 44 of the cable 42.

As shown in FIG. 1, it will be seen that the intermediate portion 44 of the cable 42 extends from the rotor assembly 34 to a forward peripheral portion of the rotor 86 assembly 34 to a forward peripheral portion of the rotor 86 and wraps around the rotor 86 for more than 180°. As shown in FIG. 1 the portion 42 extends almost or less than 360° and around the groove 88 and the crossed portion 68 of the cable 42 passes from the periphery of the rotor 86 at an opposite peripheral portion thereof from the end 40 of the bar 20 and the cross portion 68 is thus located in a departing direction from the periphery of the rotor 86 at a peripheral portion thereof which faces generally in the direction of the rotor assembly 34 as shown best in FIG. 1 of the drawings. This arrangement provides a very simple combination of a cable movement damping rotor and a cable release rotor assembly 34 as will be hereinafter described in detail.

The releasable rotor assembly 34 is provided with a mounting bracket 102 which is pivotally mounted on the bar 20 by means of a pivot pin 104 as shown best in FIG. 2 of the drawings. The bracket 102 is provided with a welded or otherwise secured upstanding axle shaft 106 on which an idler rotor 108 is rotatably mounted. This idler rotor 108 is provided with an angular groove 110 therein adapted to be engaged by the intermediate portion 44 of the cable 42. Pivotally mounted on the axle shaft 106 between the rotor 108 and the bracket 102 is a substantially L-shaped cable guide clip 112 which is closely adjacent to the periphery 114 of the rotor 108 in order to prevent displacement of the intermediate portion 44 of the cable 42 from the angular groove 110 when the rotor assembly 34 is in a broken line position 116 for creating a slack condition of the cable as will be hereinafter described.

Fixed to an end 118 of the bar 20 is an L-shaped clip 120 which overrides a movable end 122 of a bracket 102. This clip 120 is adapted to provide a hold down structure for retaining the bracket 102 in locked position for holding the cable 42 in taut condition as will be hereinafter described in detail.

As shown in FIG. 2 of the drawings, a latch lever 124 is tiltably mounted in connection with the bar 20 by means of a shaft 126 having one end fixed at 128 to the bar. The latch lever 124 is provided with an enlarged opening 128 adapted tiltably to move angularly relative to the axis of the shaft 126. This shaft 126 is provided with a threaded end portion 130 on which a lock nut 132 retains a spring 134 in compressive engagement with a normally lower side 136 of the latch lever 124.

The latch lever 124 carries a latch pin 138 which is provided with a normally upper end 140 adapted to be withdrawn from an opening 142 in the bracket 102 so as to permit the bracket 102 to pivot about the axis of the pin 104 from a solid line position shown in FIG. 1 to the broken line position 116 therein. The latch pin 138 extends through an opening 144 in the bar 20 so that when the latch pin is extended through the opening 142 and 144, the latch pin is in sheet and therefore capable of locking the bracket 102 in the solid line position as shown in FIG. 1 for holding the cable 42 taut as will be hereinafter described in detail.

The latch lever 124 as shown in FIG. 2 is in the locked or latched position and when the extending portion of the lever 124 is moved downwardly, the spring 134 is slightly compressed and the end 140 of the pin 138 is withdrawn from the opening 142 in the bracket 102. At this time, a lever 146, which is connected to the bracket 102, may be used to move the bracket 102 to the broken line position 116 as shown in FIG. 1 of the drawings.

Inasmuch as the intermediate portion 44 of the cable 42 is engaged around the angular groove 110 of the rotor 108, the assembly 34 when moved to the broken line position 16, permits substantial slack to occur in the cable 42 at its intermediate portion 44 and to allow the hooked portions of the turnbuckles 54 and 56 readily to be removed from the eye bolts 58 and 60 in connection with the bumper 32.

It will be understood that when the releasable rotor assembly 34 is moved to the broken line position 116 and the intermediate portion 44 of the cable becomes slack, it is readily and resiliently released from the groove 88 of the rotor 86 of the rotor assembly 36 and, therefore, both hooked portions of both turnbuckles 54 and 56 may readily be removed or disconnected from the eye bolts 58 and 60 so that the trailer hitch socket 28 may be removed from the ball 30 on the bumper 32 of the towing vehicle.

Likewise, the ends of the cable 42 may be coupled to the eye bolts 58 and 60 when the cable 42 is in slack position and after such coupling the lever 146 of the rotor assembly 34 may be pivoted into the solid line position 146 wherein the pin 138 is fully engaged in the opening 142 of the bracket 102 whereupon the cable 42 is held under tension and very tightly engaged at its intermediate portion with the converging angular groove 84 of the damping rotor 86 as hereinbefore described. In this position, sway movement of the tongue of a trailer relative to the bumper 32 of a towing vehicle is resisted by frictional damping between the rotor 86 and the friction plates 82 and 92 engaged with the plates 70 and 76 retained stationary relative to the bar 20 coupled to the tongue of the trailer as hereinbefore described.

As shown in FIG. 5, the bar 20 carries a releasable cable engaging rotor assembly 34 which is similar to that hereinbefore described in connection with FIGS. 1 and 2 of the drawings. The cable 42 passes over the rotor 114 and an intermediate portion of the cable 42 as shown in FIG. 5 engages a frictionally restrained rotor of a rotor assembly 150 as will be hereinafter described.

On the opposite end of the bar 20 from the releasable rotor assembly 34 is a pulley like rotor 152 which is rotatably mounted on a stationary axle shaft 154 fixed to the bar 20.

Figure 6:
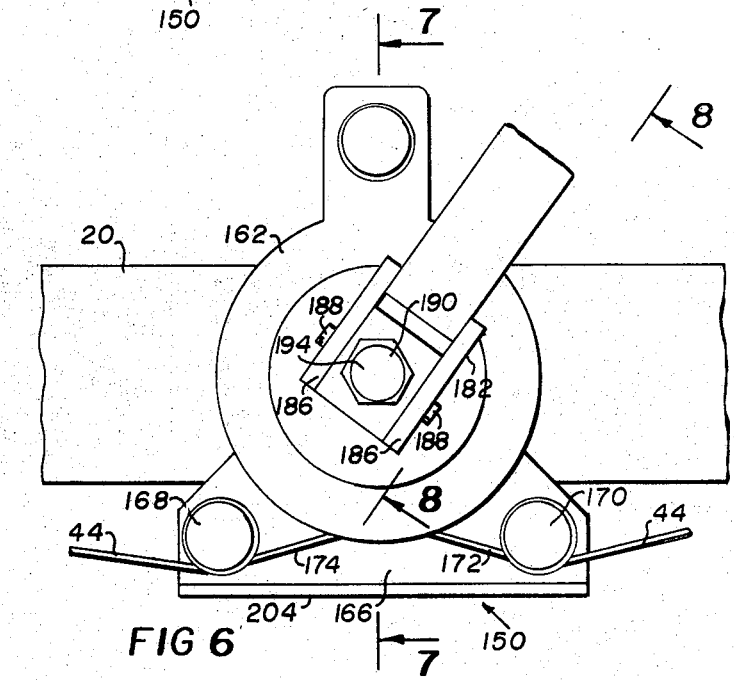
FIG. 6 is an enlarged fragmentary plan view showing a cable damping mechanism of the structure shown in FIG. 5.
Figure 7:
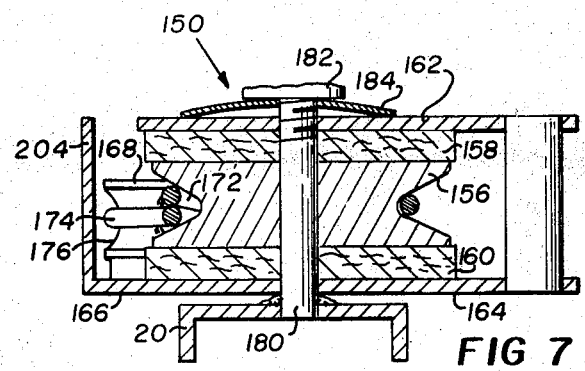
FIG. 7 is a fragmentary sectional view taken from a line 7—7 of FIG. 6.

An intermediate portion of the cable 42 extends from the hitch connection 60 over the rotor 152 and to the frictionally restrained rotor assembly 150 which is shown in detail in FIGS. 6 and 7 of the drawings.

The intermediate portion 44 of the cable 42 as shown in FIG. 6 of the drawings is wrapped substantially 360° about a pulley like rotor member 156 of the assembly 150. This rotor 156 is similar to the hereinbefore described rotor 86 shown in FIG. 4 and is engaged at opposite sides by friction plates 158 and 160 adjacent to stationary plates 162 and 164 which are similar to the hereinbefore described plates 76 and 70 respectively shown in FIG. 4 of the drawings.

The plate 164 is provided with an extending portion 166 on which are mounted a pair of guide rollers 168 and 170 which are axially offset in order to guide crossed portions 172 and 174 of the intermediate portion 44 of the cable so as to avoid interference and rubbing as shown best in FIG. 7 of the drawings.

The pulley 186 is provided with a groove portion 176 which is disposed substantially below the center of the groove 178 in the rotor 156 and the groove portion of the guide roller 170 is disposed on a level above that of the roller 168 so that the crossed cable portion 172 is held above the crossed portion 174, all as shown best in FIGS. 6 and 7 of the drawings.

Figure 8:
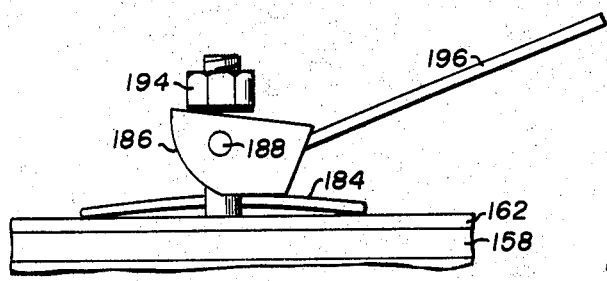
FIG. 8 is a fragmentary sectional view taken from a line 8—8 of FIG. 6 showing portions of the structure in elevation.
Figure 9:
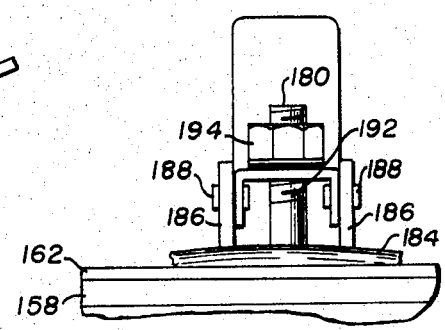
FIG. 9 is a view of the structure shown in FIG. 8 taken from a line 9—9 thereof.

An axle shaft 180 as shown in FIG. 7, is similar to the shaft 62 and mounted on the normally upper end of the shaft 180 is a cam tensioning mechanism 182 shown in detail in FIGS. 8 and 9 of the drawings. This mechanism 182 is adapted to bear upon the resilient Belleville type washer 184. The cam mechanism 182 is provided with a pair of cam plates 186 which bear upon the Belleville washer 184 and which are pivoted about the axis of the pin 188 which is carried by a U-shaped yoke 190 through the center of which a normally upper end portion 192 of the axle shaft 180 extends. Screw threaded on the upper end of the axle shaft 180 is the lock nut 194 adapted to maintain adjustment of the yoke 190 relative to the Belleville washer 184 so that the cam portions 186 may bear efficiently and compressively on the Belleville washer 186 when the handle 196 in connection with the cam plates 186 is in the solid line position as shown in FIGS. 8 and 9.

When handle 196 is in a broken line position as indicated in FIG. 8 of the drawings, the cam portions of the plates 186 being closer to the axis of the shaft 188 engage the Belleville washer 174 and provide for vertical release thereof to reduce the friction of the friction plates 158 and 160 on opposite sides of the rotor 156 and thereby allowing the rotor to rotate freely and release the cable wrapped around during hitching and unhitching operations relative to the eye bolts 58 and 60.

To further augment the releasing operation, a conventional toggle type cable tightener 198 interconnects a hook 200 and a chain 202 which hook 200 engages the eye bolt 58 and which chain 202 is connected to an end of the cable 42 all as shown best in FIG. 5 of the drawings.

It will be appreciated by those skilled in the art that the idler rollers 168 and 170 as shown in FIGS. 6 and 7 of the drawings provide for the guidance of the intermediate portion 44 of the cable around the rotor 156 in the angular groove 178 thereof and permit the intermediate portion 44 of the cable 42 at its crossed portions 172 and 174 to operate freely without rubbing over each other and also provide for substantially 360° engagement of the cable with the angular groove portion 178 of the rotor 156.

The extending bracket portion 166 of the plate 164 as shown in FIGS. 6 and 7 of the drawings is provided with an upstanding guide portion 204 disposed adjacent to the peripheries of the guide rollers 168 and 170 for retaining the cross portions 172 and 174 of the intermediate cable portion 44 in relation to the angular groove portions of the guide rollers 168 and 170 when the cable 42 is in slack position for hitching and unhitching as hereinbefore described in connection with the structure shown in FIG. 1 of the drawings.

Figure 10:
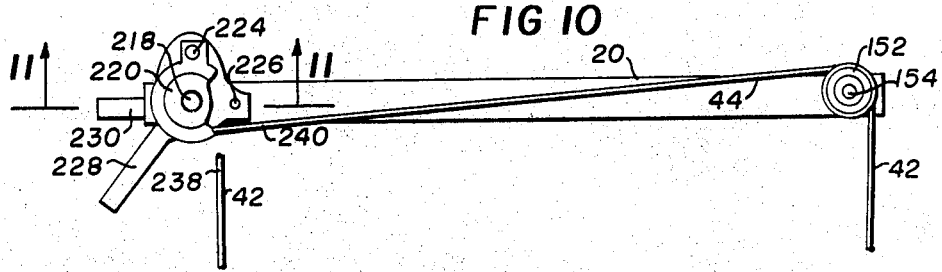
FIG. 10 is a fragmentary plan sectional view of a modification of the invention showing an idler rotary member and a releasable frictionally damped rotary member coupled to a bar which is adapted to be connected to the tongue of a conventional trailer.

In the modification of the invention as shown in FIG. 10, the bar 20 carries an idler rotor 152 rotatably mounted on a stationary axle shaft 154 as shown and described in connection with FIG. 5 of the drawings. The intermediate portion 44 of the cable 42 passes over this idler rotor 152 and passes laterally to a generally forward peripheral portion of a frictionally restrained roller of a releasable rotor assembly designated 206 in FIG. 10 of the drawings. This releasable rotor assembly 206 is similar in its releasable mounting mechanism to the releasable rotor assembly 34 shown in FIG. 2 and the frictionally restrained rotor mechanism of the assembly 206 is similar to the frictionally restrained rotor mechanism 36 as shown in FIG. 4.

Figure 11:
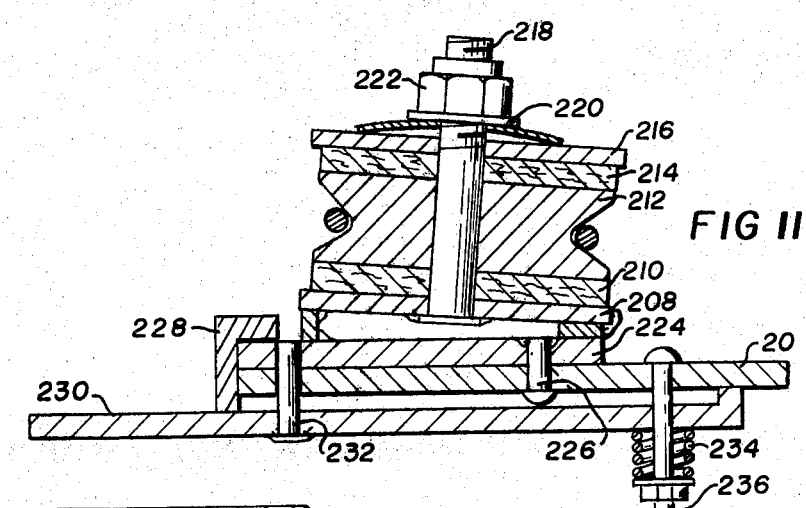
FIG. 11 is an enlarged fragmentary sectional view taken from a line 11—11 of FIG. 10.

Accordingly, reference is made to FIG. 11 wherein a plate 208 is similar to the plate 70 shown in FIG. 4. A friction plate 210 is similar to the friction plate 82 shown in FIG. 4. A rotor 212 is similar to the rotor 86 shown in FIG. 4. A friction plate 214 is similar to the friction plate 92 shown in FIG. 4. A stationary plate 216 is similar to the stationary plate 76 shown in FIG. 4. An axle shaft 218 is similar to the axle shaft 62. A Belleville washer 220 is similar to the Belleville washer 92. A nut 222 is similar to the nut 98 shown in FIG. 4.

With reference to FIG. 10, it will be seen that a shaft 224 is similar to the shaft 74 shown in FIG. 4 of the drawings.

The plate 208 is mounted on a bracket 224 similar to the bracket 102 shown in FIG. 2 of the drawings and this bracket 224 is pivoted by means of a pin 226 to the bar 20.

Integral with the bracket 224 is a handle 228 operable similarly to the handle 146 in connection with the bracket 102 and as hereinbefore described.

A retaining clip 229 is secured to the end of the bar 20 and overrides the end of the bracket 224 while a release lever 230 carries a release pin 232 and the lever 230 is similar to the lever 124 hereinbefore described carrying the pin 138 as hereinbefore described. Thus, the pin 232 is releasable from an opening in the bracket 224 to allow the bracket 224 to pivot about the axis of the pin 226 and to move the axis of the axle shaft 218 laterally to provide for a slack condition of the cable 42 at its intermediate portion so that hitching and unhitching relative to the eye bolts 58 and 60 as shown in FIG. 1 may be accomplished with facility.

A holding spring 234 on a bolt 236 operates similarly to the hereinbefore described spring 134 and bolt 126 shown in FIG. 2 of the drawings for holding the release lever 230 and pin 232 in locked position.

Figure 12:
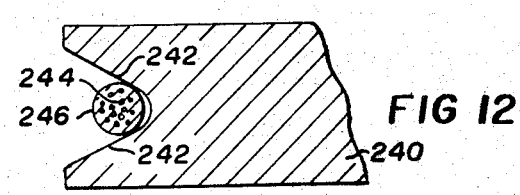
FIG. 12 is an enlarged fragmentary sectional view showing the peripheral groove in one of the rotary members of the invention and showing a control cable of the invention in cross section; said cable being of the coated, impregnated type.

It will be seen that the plane of the plate 208 is inclined relative to the plane of the bar 20 so that crossed portions 238 and 240 of the intermediate portion 44 of the cable 42 may readily clear each other as the cables extend away from the rotor 212, this being a condition similar to that disclosed and described in connection with FIGS. 3 and 4 of the drawings and the crossed portions 66 and 68 of the intermediate portion of the cable 44. As shown in FIG. 12 of the drawings, a frictionally restrained rotor 241 may be similar to the rotor 212 or 86 hereinbefore described or may be similar to the rotor 156 shown in FIG. 7 of the drawings. This rotor 241 being provided with a converging angular groove 242 while a cable 244 is impregnated with a plastic material which provides an external plastic coating 246 having a high coefficient of friction relative to the converging angular groove 242 so as to provide maximum holding force when the periphery of the plastic coated cable 244 is wedged in the converging angular groove 242 as shown in FIG. 12 of the drawings.

The diameter of the coated cable being such as to wedge efficiently for substantially 180° of its cross section in the angular groove 242 and thus the cable 42 of the invention may be modified to utilize the coating 246 which is integral with plastic which impregnates the strands of the cable.

Figure 13:
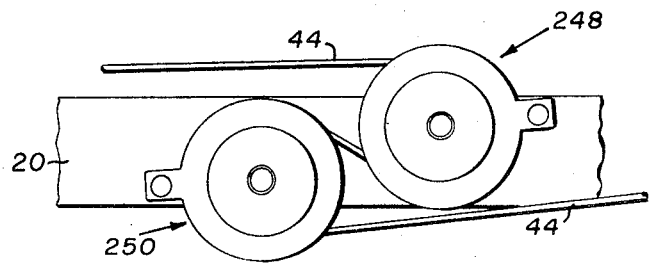
FIG. 13 is a fragmentary plan sectional view of a pair of frictionally damped rotary members of the invention disposed to engage a control cable of the invention in a generally S-shaped arrangement to attain substantial engagement of the rotary damped members by the cable of the invention.

As shown in FIG. 13, a modification of the invention comprises the bar 20 on the opposite ends of which may be located stationary axle shafts 154 and respective cable engaging rollers 152 as shown and described in connection with FIGS. 5 and 10 of the drawings.

The bar 20 as shown in FIG. 13, carries a pair of frictionally restrained rotor assemblies 248 and 250 mounted on the bar 20 in standard position so as to hold the cable at its intermediate portion 44 in a substantially S-shaped pattern and maintain substantially more than 180° of engagement of the cable with peripheries of the frictionally restrained rotors which may be similar to those disclosed in connection with FIGS. 4, 7, and 11 of the drawings.

Figure 14:
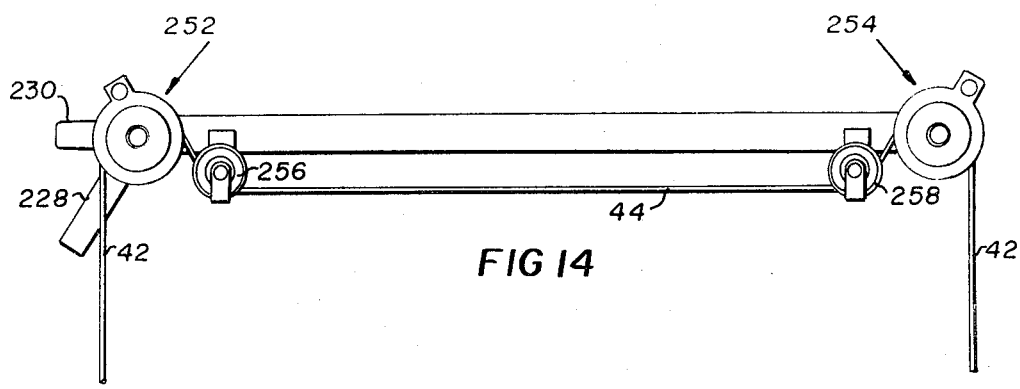
FIG. 14 is a plan view similar to FIG. 10 but showing a further modification of the invention.

As shown in FIG. 14, a further modification of the invention comprises the bar 20 carrying frictionally restrained rotor assemblies 252 and 254 similar to the assembly 36 shown in FIGS. 1 and 4 of the drawings. The assembly 252 being similar to the releasably mounted assembly 206 shown in FIGS. 10 and 11 of the drawings.

Adjacent to the periphery of the assembly 252 is a stationary cable guide rotor 256 and adjacent to the assembly 254 as shown in FIG. 14 is a stationary cable engaging guide rotor 258. These rotors 256 and 258 are stationary mounted idler rotor assemblies similar to the rotor 152 hereinbefore described. These rotor assemblies 256 and 258 acting as idlers are so disposed that they maintain substantially 180° of the intermediate portion 44 of the cable with the frictionally restrained rotors of the rotor assemblies 252 and 254.

Figure 15:
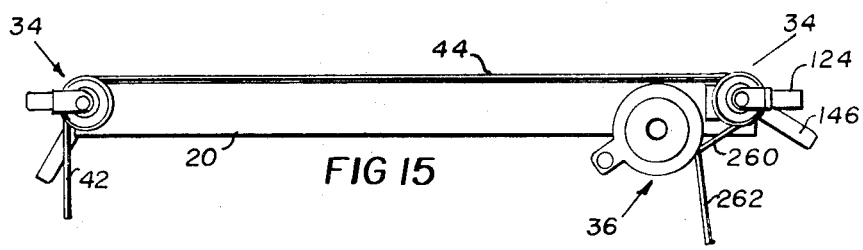
FIG. 15 is another view similar to FIGS. 10 and 14 but showing an additional modification of the invention.

In the modification of the invention as shown in FIG. 15, the bar 20 carries a releasable assembly 34 on one end thereof. The intermediate portion of the cable 44 extends over the releasable rotor assembly 34 and over a similar releasable rotor assembly 34 on the opposite end of the bar 20. These assemblies 34 are similar to that hereinbefore described in connection with FIGS. 1 and 2 of the drawings.

A frictionally restraining rotor assembly 36 similar to that disclosed in FIGS. 1 and 4 of the drawings, is located adjacent to the releasable rotor assembly 34 so that crossed cable portions 260 and 262 extend respectively from the releasable rotor assembly 34 and the frictionally restraining rotor assembly 36 as shown best in FIG. 15 of the drawings. It will be understood that the assembly 36 is tilted on its axis as shown in FIG. 4 of the drawings so that the crossed cable portions 260 and 262 clear each other as illustrated in FIG. 3 of the drawings and in a similar manner to the crossed cable portions 66 and 68 disclosed therein.

Figure 16:
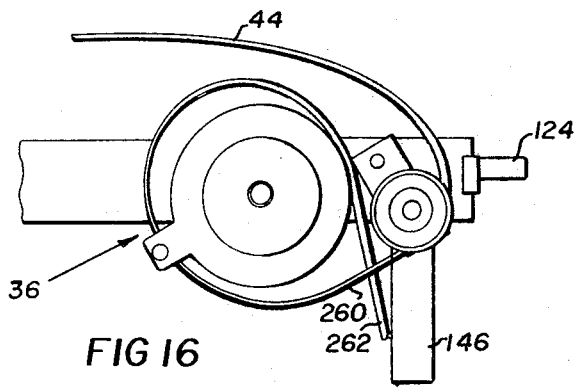
FIG. 16 is an enlarged plan view showing a portion of the structure shown in FIG. 15 but showing a releasable idler adjacent to a frictionally damped rotary member so as to provide for tightening and slackening of the control cable of the invention.

When a release lever 146 of the releasable rotor assembly 34 is pivoted to the position as shown in FIG. 16 of the drawings, the intermediate portion of the cable 44 is slack so that the crossed portions 260 and 262 are relaxed relative to the assembly 36 to thereby relieve the cable from the restrained rotor of the restraining rotor assembly 36 and to allow facility in the hooking and unhooking of opposite ends of the cable 42 relative to the structure such as eye bolts 58 and 60 as shown in FIG. 1 of the drawings hereinbefore described.

It will be obvious to those skilled in the art that various modifications of the invention may be resorted to without departing from the spirit of the invention.

I claim:

1. In a sway control device for trailers the combination of: a cable having first and second opposite ends and an intermediate portion between said ends; first and second spaced apart connection means disposed for connection and disconnection of said first and second opposite ends of said cable relative to a towing vehicle; first and second spaced apart rotary means adapted to be connected to a trailer; each rotary means having a generally annular single groove cable engaging portion frictionally engaged by said intermediate portion of said cable, at least one of said rotary means comprising a damped rotor having said cable engaging portion near the periphery thereof; friction plate means frictionally engaging said rotor; stationary means engaging said friction plate means; said stationary means being adapted for connection with a trailer; said damped rotor disposed and holding said intermediate portion of said cable in disposition and in engagement with more than 180° and less than 360° around said annular single groove cable engaging portion of said damped rotor, the axis of said damped rotor being tilted to avoid rubbing of said cable near to said damped rotor; said opposite ends of said cable extending respectively from said first and second rotary means to said first and second connection means.

2. The invention as defined in claim 1, wherein: a bar supports said first and second rotary means near opposite ends thereof.

3. The invention as defined in claim 1 wherein toggle means is coupled to said cable in order to provide for slackening thereof by releasing said toggle and to thereby permit facility in the hitching and unhitching of opposite ends of said cable relative to a towing vehicle.

4. The invention as defined in claim 1, wherein: at least one of said rotary means movably mounted for moving its rotary axis laterally in a direction to permit a slack condition of said cable; a release means for holding said last mentioned rotary means in a stationary position in which said cable is held taut on said plurality of rotary means; said last mentioned rotary means having a mount adapted to move in a direction laterally relative to the axis of said last mentioned rotary means.

5. In a sway control device for trailers the combination of: a cable having first and second opposite ends and an intermediate portion between said ends; first and second spaced apart connection means disposed for connection and disconnection of said first and second opposite ends of said cable relative to a towing vehicle; first and second spaced apart rotary means adapted to be connected to a trailer; each rotary means having a generally annular single groove cable engaging portion frictionally engaged by said intermediate portion of said cable, at least one of said rotary means comprising a rotor having said cable engaging portion near the periphery thereof; friction plate means frictionally engaging said rotor; stationary means engaging said friction plate means; said stationary means being adapted for connection with a trailer; said rotor disposed and holding said intermediate portion of said cable in disposition and in engagement with more than 180° and less than 360° around said annular single groove cable engaging portion of said rotor, the axis of said rotor being tilted to avoid rubbing of said cable near to said rotor; said opposite ends of said cable extending respectively from said first and second rotary means directly to said first and second connection means; at least one of said rotary means is provided with a movable mount adapted, when moved, to shift the axis of the respective rotary means laterally; releasable means for holding said mount in position to maintain said cable taut over said first and second rotary means and relative to said first and second ends of said cable; said releasable means, when released, disposed to allow said mount and said respective rotary means to shift and cause a slack condition of said cable to thereby provide facility in the connection and disconnection thereof relative to a towing vehicle.

* * * * *